United States Patent
Dietze

(10) Patent No.: US 12,483,876 B2
(45) Date of Patent: Nov. 25, 2025

(54) PROFILE AND SUBSCRIBER IDENTITY MODULE HAVING PROFILE

(71) Applicant: GIESECKE+DEVRIENT MOBILE SECURITY GERMANY GMBH, Munich (DE)

(72) Inventor: Claus Dietze, Obersochering (DE)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 331 days.

(21) Appl. No.: 18/339,483

(22) Filed: Jun. 22, 2023

(65) Prior Publication Data

US 2023/0422017 A1 Dec. 28, 2023

(30) Foreign Application Priority Data

Jun. 22, 2022 (EP) ..................................... 22020293

(51) Int. Cl.
*H04W 8/18* (2009.01)
(52) U.S. Cl.
CPC .................. *H04W 8/183* (2013.01)
(58) Field of Classification Search
None
See application file for complete search history.

(56) References Cited

U.S. PATENT DOCUMENTS 10,530,756 B1    1/2020  Youngs et al.
2022/0046408 A1* 2/2022  Kang .................... H04W 8/183

FOREIGN PATENT DOCUMENTS

EP           3073770 A1    9/2016

OTHER PUBLICATIONS

European Search Report from corresponding EP Application No. 22020293.1, Dec. 14, 2022.
Unknown: "GSM Association Non-confidential SGP.31 eSIM IoT Architecture and Requirements", Apr. 19, 2022.
Unknown V3: "GSM Association Non-confidential Official Document SGP.21-RSP Architecture", Mar. 28, 2022.
V Gsma et al: "GSM Association Non-confidential Official Document SGP.22-SGP.22 RSP Technical Specification Security Classification: Non-confidential GSM Association Non-confidential Official Document SGP.22-SGP.22 RSP Technical Specification", Jun. 5, 2020.
"SGP.22 Rsp Technical Specification", GSMA, Version 3.0, Oct. 19, 2022.

* cited by examiner

*Primary Examiner* — Gary Lafontant
(74) *Attorney, Agent, or Firm* — Workman Nydegger

(57) ABSTRACT

A profile for implementation in a or implemented in a subscriber identity module (eUICC), wherein the profile can adopt at least a first and a second profile state. The profile including profile metadata. The profile metadata has a profile-state-management flag which can adopt a first and a second flag state of the profile-state-management flag. If the flag adopts the first flag state, any management servers are permitted to change the profile state of the profile.

12 Claims, 1 Drawing Sheet

[3] [SGP.31], Figur 1 +

PROFILE AND SUBSCRIBER IDENTITY MODULE HAVING PROFILE

FIELD OF THE INVENTION

The invention relates to a profile for authenticating a mobile radio subscriber to a mobile radio network, and a subscriber identity module comprising a profile implemented therein.

The world is connected by mobile networking, and the mobile networking continues to develop. Mobile-radio-enabled terminals communicate via mobile radio networks. The mobile-radio-enabled terminals from the consumer sector include smartphones and mobile telephones. Mobile-radio-enabled terminals also include devices from the IoT (Internet of Things) realm, such as controlling devices (control devices or measurement devices or combined control/measurement devices) for industrial facilities in a commercial or private setting. Industrial facilities are, for example, manufacturing plants which have one or more controlling devices (terminals) which can use a mobile radio network to communicate with a background system or/and with each other. Further industrial facilities are smart home facilities, such as heating systems and electricity consumers, having terminals in the form of controlling devices.

In order for a mobile-radio-enabled terminal to be used in a mobile radio network of a network operator, the terminal contains a subscriber identity module having a subscription profile, or profile for short. The profile deals with the configuration of the terminal and of the connection of the terminal in the mobile radio network. The profile is formed by a dataset which allows a connection of the terminal to be set up, operated and terminated in the mobile radio network, and comprises, for example, a cryptographic authentication key Ki and an International Mobile Subscriber Identity IMSI.

The subscriber identity module can have various form factors, in particular plug-in, embedded, integrated and software. Subscriber identity modules with a plug-in and embedded form factor are arranged on their own dedicated chip or SoC (System on Chip). Plug-ins are, for example, a SIM (Subscriber Identity Module) card or USIM (Universal SIM) card or UICC (Universal Integrated Circuit Card) and make contact with the terminal via a card reader. Alternatively, the dedicated chip can be integrated in a housing which is able to be permanently soldered or is permanently soldered in the terminal. A subscriber identity module that is able to be soldered in or is soldered in is provided with the extension "embedded" and is designated as eUICC, wherein e stands for embedded and the rest of the designation is taken from the correspondingly equipped plug-in. Further possible form factors of a subscriber identity module are integrated subscriber identity modules which are integrated on a terminal chip or SoC (System on Chip) of the terminal as well, that is to say do not have their own chip. Integrated subscriber identity modules are provided with the extension "integrated" and are, e.g., designated as integrated UICC, iUICC. Further possible form factors of a subscriber identity module are pure software modules which have the functionality of a subscriber identity module and which are integrated in a terminal chip.

BACKGROUND

The technical specification [1] [SGP.22] "GSMA SGP.22 RSP Technical Specification Version 2.2.2, 5 Jun. 2020" is concerned with the remote management of subscriber identity modules, eUICCs, in mobile-radio-enabled terminals from the consumer sector. According to [1] [SGP.22], Section 3.2 "Local Profile Management", the state of a profile, enabled (activated) or disabled (deactivated), can be changed by means of a command sent from a profile-management server SM-DP+ to the eUICC via a Local Profile Assistant, LPA, located in the terminal or in the eUICC. A profile can be put into the enabled (activated) state using the command Profile Enable. A profile can be put into the disabled (deactivated) state using the command Profile Disable. According to Section 2.9.1 "Profile Policy Rules", profile policy rules can be used to stipulate whether or not it is permissible to disable (deactivate) profiles. Profile policy rules are part of the profile metadata, which are in turn part of the profile.

Document [2] [SGP.22 v3.0 Draft] GSMA RSP Technical Specification Version 3.0 Draft, which is unpublished on the filing date of the application and constitutes company-internal, non-public prior art, additionally provides, in Section 3.7, remote profile management and remote eUTCC management, in accordance with which a profile-management server SM-DP+ or managing DP+(a managing DP+ is a profile-management server analogous to the SM-DP+ which, in contrast to an SM-DP+, is managed by a mobile radio network operator MNO; an SM-DP+ is managed by a profile provider) can send Enable Profile operations (commands), in order to enable (activate) profiles, and Disable Profile operations (commands), in order to disable (deactivate) profiles, to eUICCs. The state of a profile can thus be changed by the profile-management server SM-DP+(or managing DP+) from afar, by remote management. Furthermore, in Section 3.8, remote management by the network operator is described. According to Section 3.7, there is provision for a profile-management server SM-DP+(or possibly a managing DP+) to have to be authorized in order to be allowed to change the state of a profile in an eUICC, for example by way of an Enable Profile or Disable Profile operation.

Document [3] [SGP.31] "GSMA SGP.31 eSIM IoT Architecture and Requirements Version 1.0, 19 Apr. 2022" is concerned with the architecture and the requirements of subscriber identity modules, eUICCs, in the realm of the Internet of Things, IoT. An IoT eUICC is managed remotely, depending on the type of management activity, by an eSIM IoT remote manager, eIM, remote management server or by a profile-management server SM-DP+ or managing DP+, which each communicate with the eUICC via an IoT Profile Assistant, IPA, located in the terminal or in the eUICC. Profile download, that is to say the downloading of profiles to eUICCs, takes place by way of the profile-management server SM-DP+. Profile-state management, in particular the changing of the profile state of a profile by way of a remotely sent operation such as Enable Profile or Disable Profile, takes place by way of the eSIM IoT remote manager, eIM, remote management server. Operations by way of which the profile state of a profile is changed are also referred to as Profile-State-Management Operations, PSMO.

In the realm of the Internet of Things (IoT), it may be necessary for the state of a profile in an eUICC of a mobile-radio-enabled IoT terminal to be changed by a previously unknown eSIM IoT remote manager eIM remote management server. The scenario in which a previously unknown server carries out management measures on an eUICC in the IoT realm is also referred to as Open Market IoT. Remote management, or management from afar, of a profile implemented in an eUICC by a previously unknown server is not addressed in the previous specifications.

According to document [3] [SGP.31], Section 6.2, Profile Enabling, and Section 6.3, Profile Disabling, there is provision for a request signed by the eIM to be sent to the eUICC for a profile-state change by means of an Enable Profile or Disable Profile operation. Therefore, only one previously identified eSIM IoT remote manager, eIM, remote management server, which creates a signature and sends it to the eUICC, has the possibility to change the state of a profile in an eUICC. The solutions provided in document [3] [SGP.31] and the further specifications are therefore insufficient to give the also previously unknown servers the opportunity to change a profile state.

SUMMARY OF THE INVENTION

The invention is based on the object of providing an opportunity for state management of profiles which permits previously unknown servers, in particular previously unknown eSIM IoT remote manager eIM remote management servers, to change the state of profiles in eUICCs in mobile-radio-enabled terminals.

The object is achieved by a profile according to Claim 1. Advantageous configurations of the invention are specified in the dependent claims.

The profile according to the invention according to Claim 1 is intended for implementation in a subscriber identity module—for this purpose the profile can be provided on a server, for example —, or alternatively is already implemented in a subscriber identity module. The profile can adopt at least a first and a second profile state. The profile comprises profile metadata. The profile is wherein the profile metadata comprise a profile-state-management flag which can adopt a first and a second flag state of the profile-state-management flag, wherein, if the flag adopts the first flag state, any management servers are permitted to change the profile state of the profile.

The flag solution according to the invention makes it possible to permit previously unknown management servers to make state changes to profiles, since the management server does not need to be explicitly named in this case.

In particular if the profile is implemented in an eUICC which is operated in an IoT terminal, the flag solution according to the invention provides the opportunity for a previously unknown eSIM IoT remote manager eIM remote management server—in the case of a corresponding flag state of the profile-state-management flag—to change the state of the profile without the eSIM IoT remote manager eIM necessarily having to identify or authenticate itself in advance.

Therefore, according to Claim 1, a profile is provided which provides an opportunity for state management of the profile which permits previously unknown servers, in particular previously unknown eSIM IoT remote manager eIM remote management servers, to change the state of the profile.

According to the invention, there is furthermore provision for a subscriber identity module, eUICC, in which there is provision for a profile or a plurality of profiles which comprise a profile-state-management flag according to the invention.

According to the invention, there is furthermore provision for a server, in particular a profile-management server, such as, for example, a GSMA SM-DP+ server, having one or more profiles, stored on the server, which comprise a profile-state-management flag according to the invention. The profiles are provided on the server, preferably for profile download to subscriber identity modules.

Optionally, the first and second flag states of the profile-state-management flag that are provided are the states set and not set. The flag states set and not set can be produced, for example, in the case of a flag which comprises only one bit, by the values zero and one of a bit, with any desired assignment of set/not set to zero/one. According to alternative embodiments, a flag which comprises more than one bit can be provided.

Optionally, the first and second profile states provided are the states enabled and disabled in accordance with the GSMA. Further possibilities for a profile state are specified further below.

Optionally, the profile metadata comprise a plurality of profile-metadata entries, wherein each profile-metadata entry is characterized by a data type, and wherein the profile-state-management flag is in the form of a profile-metadata entry and is characterized by a Profile-State-Management Operation, PSMO, configuration data type. A PSMO configuration data type is not provided in present GSMA specifications but is useful for the implementation of the profile-state-management flag according to the invention. It is therefore advantageous to also define the new data type in program code definitions in connection with the invention.

According to preferred embodiments of the invention, the profile-state-management flag according to the invention is provided in an Internet of Things, IoT, setting in accordance with GSMA [3] [SGP.31]. In this case, if the flag adopts the first flag state, in particular any eSIM IoT remote manager, eIM, GSMA remote management servers are permitted to change the profile state of the profile.

According to some embodiments of the profile, there is provision for a generic profile-state-management flag which generally permits or does not permit profile-state operations, in accordance with the flag state.

According to some embodiments, the profile-state-management flag addresses one or more particular functions for state management and comprises one or more of the following flag segments:

flag segment enable(0), in order to permit or not permit enabling, activating, of the profile, depending on the flag state of the flag segment;

flag segment disable(1), in order to permit or not permit disabling, deactivating, of the profile, depending on the flag state of the flag segment;

flag segment delete(2), in order to permit or not permit deleting of the profile, depending on the flag state of the flag segment;

flag segment listProfileInfo(3), in order to permit or not permit outputting of profile information pertaining to the profile, depending on the flag state of the flag segment;

flag segment contactPcmp(4), in order to permit or not permit communication with a Profile Content Management Platform, PCMP, depending on the flag state of the flag segment;

flag segment updateMetadata(5), in order to permit or not permit updating of the profile metadata of the profile, depending on the flag state of the flag segment.

In the embodiments specified here, each of the flag segments can in each case adopt a first flag state and a second flag state of the flag segment of the profile-state-management flag.

The Profile Content Management Platform, PCMP, provided can optionally be an OTA (Over-The-Air) server, from which (therefore OTA) data, profiles, operations, commands and the like can be sent to a subscriber identity module via a radio interface, and responses from the subscriber identity module can be received by the OTA server/PCMP.

Optionally, the conventional solution of entering one (or more) approved servers, e.g. SM-DP+ or eIM, which is/are authorized to carry out profile-management operations into the profile metadata is replaced by the profile-state-management flag according to the invention.

Optionally, as an alternative, one or more approved servers, e.g. SM-DP+ or eIM, which is/are authorized to carry out profile-management operations is/are entered into the profile metadata in addition to the profile-state-management flag according to the invention.

A method according to the invention for changing the state of a profile which is implemented in a subscriber identity module and comprises a profile-state-management flag according to the invention comprises the following steps, which are carried out in the subscriber identity module:

receiving, from a server (optionally via a profile assistant such as the IPA according to [3] or LPA according to [1], [2], which can each also be located in the terminal), a profile-state operation which aims to change a profile state of the profile from a first profile state to a second profile state;

ascertaining the flag state of the profile-state-management flag;

depending on the ascertained flag state, changing the profile state in accordance with the state operation, or rejecting the execution of the profile-state operation.

Optionally, the state operation provided is an Enable Profile operation, for enabling (activating) the profile, or a Disable Profile operation for disabling (deactivating) the profile. Optionally, the state operation provided is one or more of the following state operations: a Delete Profile operation, in order to delete the profile; a List Profile Info operation, in order to retrieve and list information pertaining to the profile; a Contact PCMP operation, in order to establish communication with a Profile Content Management Platform, PCMP; an Update Metadata operation, in order to update, i.e. to change, the profile metadata.

According to some embodiments of the invention, the server provided is an eSIM IoT remote manager, eIM, GSMA remote management server, e.g. such as described in [3][SGP.31].

Optionally, the subscriber identity module receives the profile-state operation in a Profile-State-Management package, PSMO package, and the subscriber identity module extracts the profile-state operation from the PSMO package, and subsequently executes the profile-state operation.

The operation provided in the above-described context can optionally be a command, and furthermore optionally a single command or alternatively also a sequence of a plurality of commands.

The proposed solution is particularly applicable for document [4] [SGP.32] GSMA SGP.32 eSIM IoT Technical Specification (unpublished on the application date of the application), to which the Applicant provides contributions.

BRIEF DESCRIPTION OF THE DRAWINGS

The invention is explained in more detail below on the basis of exemplary embodiments and with reference to the drawing, in which.

DETAILED DESCRIPTION OF EXEMPLARY EMBODIMENTS

Figure 1:
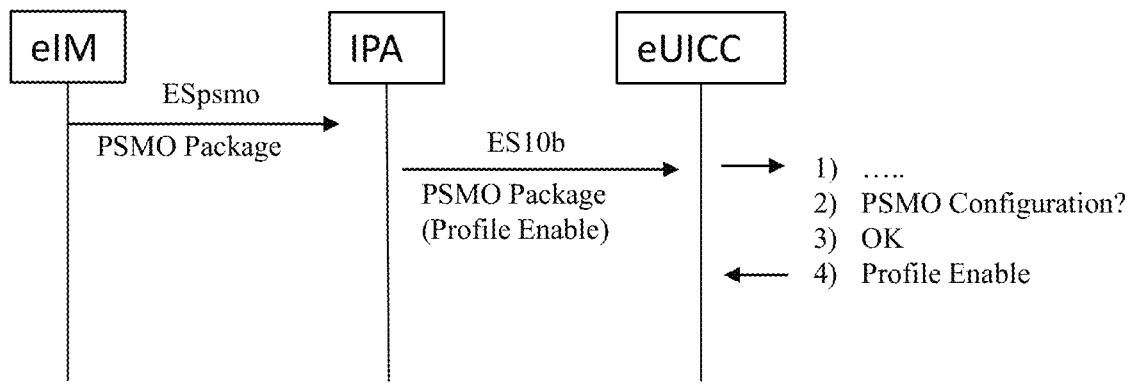
FIG. 1 shows a schematic representation of the reception of a PSMO package containing a PSMO operation, Profile Enable, by a subscriber identity module eUICC from an eSIM IoT remote manager, eIM, remote management server, according to one embodiment of the invention.

FIG. 1 shows a schematic representation of the reception of a PSMO package containing a PSMO operation, Profile Enable, by a subscriber identity module eUICC from an eSIM IoT remote manager, eIM, remote management server, according to one embodiment of the invention. The subscriber identity module eUICC is operated in a terminal which contains an IoT Profile Assistant IPA. The subscriber identity module eUICC contains (at least) one profile. The eSIM IoT remote manager, eIM, remote management server sends a PSMO package to the IoT Profile Assistant IPA via the channel ESpsmo. The PSMO package contains a Profile Enable operation for the profile contained in the subscriber identity module eUICC. The IoT Profile Assistant IPA forwards the PSMO package to the subscriber identity module eUICC via the channel ES10b.

Figure 2:
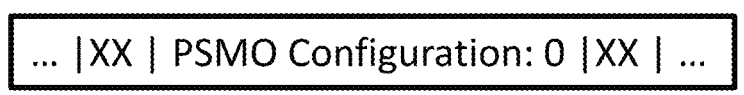
FIG. 2 shows a schematic representation of an excerpt from profile metadata, according to one embodiment of the invention.

FIG. 2 shows a schematic representation of an excerpt from profile metadata of an exemplary profile, according to one embodiment of the invention. According to the invention, according to one embodiment, the profile metadata contain an additional data field for the Profile-State-Management Operation configuration, PSMO configuration. There is provision in the PSMO configuration for a profile-state-management flag, which can have the value zero (0) or one (1). Depending on the value of the profile-state-management flag, 0 or 1, any eSIM IoT remote manager, eIM, GSMA remote management servers are unconditionally permitted, or not readily permitted, to change the state of the profile. Optionally, 0 or 1 can be the value for which the profile-state change is unconditionally permissible. In the case of a value of the profile-state-management flag which does not (readily) permit the profile state to be changed, a further entry in the profile metadata can optionally be checked in addition. For example, an eSIM IoT remote manager, eIM, remote management server expressly entered in the profile metadata always has permission to change the profile state of the profile irrespective of the value of the profile-state-management flag. Alternatively, the profile metadata do not contain an expressly entered eSIM IoT remote manager, eIM, remote management server which always has permission to change the profile state of the profile irrespective of the value of the profile-state-management flag.

An exemplary routine for the implementation of a profile-state-management flag is shown below.

```
-------
--ASN1START
PsmoConfiguration ::= SEQUENCE { --#SupportedForPsmoV1.0#
PsmoSupportedFlag BOOLEAN, -- indicates whether the Profile permits PSMO operations
}
PsmoType ::= BIT STRING{
enable(0), disable(1), delete(2), listProfileInfo(3), contactPcmp(4), updateMetadata(5)
}
--ASN1STOP
-------
```

Figure 3:
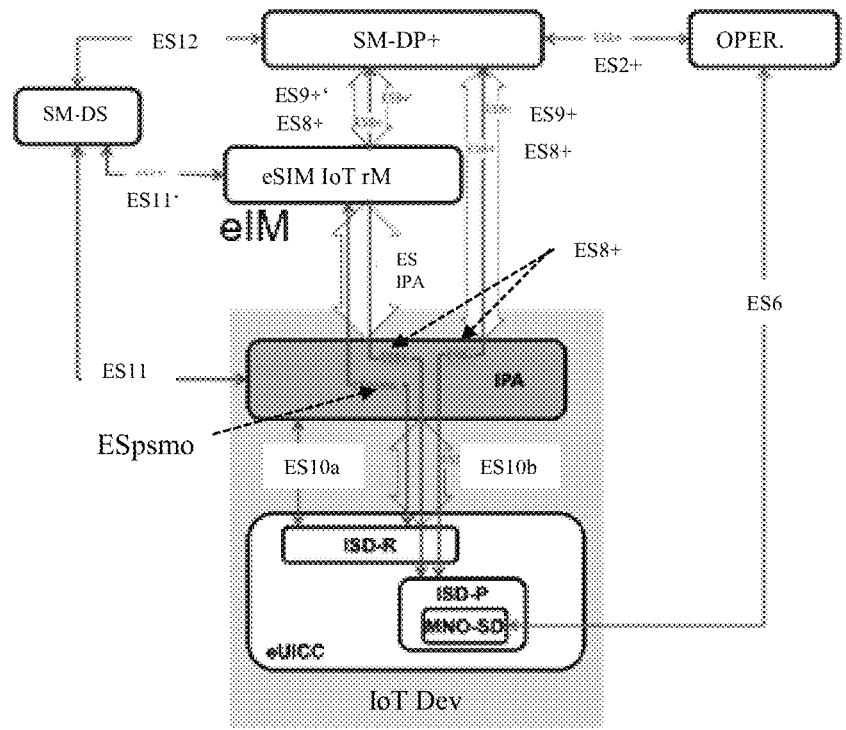
FIG. 3 shows FIG. 1 from document [3][SGP.31], with additional labels.

FIG. 3 shows FIG. 1 from document [3] [SGP.31], with additional labels, in particular to improve readability. FIG. 3 shows a profile-management server SM-DP+, an eSIM IoT remote manager, eIM, remote management server, an IoT Profile Assistant IPA, an IoT Dev terminal and a subscriber identity module eUICC.

In a subscriber identity module eUICC in the IoT setting, for example according to FIG. 3 and document [3] [SGP.31], a profile-state operation can be sent, for example, from the eSIM IoT remote manager, eIM, remote management server to the IoT Profile Assistant IPA located in the terminal or in the eUICC via the ESpsmo, and can be forwarded by the IoT Profile Assistant IPA to the subscriber identity module eUICC via the communication channel ES10b.

The invention claimed is:

1. A profile for implementation in a or implemented in a subscriber identity module (eUICC), wherein the profile can adopt at least a first and a second profile state, the profile comprising profile metadata, wherein the profile metadata comprise a profile-state-management flag which can adopt a first and a second flag state of the profile-state-management flag, wherein, if the flag adopts the first flag state, any management servers are permitted to change the profile state of the profile.

2. The profile according to claim 1, wherein the first and second flag states provided are the states set and not set.

3. The profile according to claim 1, wherein the first and second profile states provided are the states enabled and disabled in accordance with the GSMA.

4. The profile according to claim 1, wherein the profile metadata comprise a plurality of profile-metadata entries, wherein each profile-metadata entry is characterized by a data type, and wherein the profile-state-management flag is in the form of a profile-metadata entry and is characterized by a Profile-State-Management Operation, PSMO, configuration data type.

5. The profile according to claim 1, wherein, if the flag adopts the first flag state, any eSIM IoT remote manager, eIM, GSMA remote management servers are permitted to change the profile state of the profile.

6. The profile according to claim 1, wherein the profile-state-management flag comprises one or more of the following flag segments, which can each adopt a first and a second flag state of the flag segment of the profile-state-management flag:

flag segment enable, in order to permit or not permit enabling, activating, of the profile, depending on the flag state of the flag segment;

flag segment disable, in order to permit or not permit disabling, deactivating, of the profile, depending on the flag state of the flag segment;

flag segment delete, in order to permit or not permit deleting of the profile, depending on the flag state of the flag segment;

flag segment listProfileInfo, in order to permit or not permit outputting of profile information pertaining to the profile, depending on the flag state of the flag segment;

flag segment contactPcmp, in order to permit or not permit communication with a Profile Content Management Platform, PCMP, depending on the flag state of the flag segment;

flag segment updateMetadata, in order to permit or not permit updating of the profile metadata of the profile, depending on the flag state of the flag segment.

7. The subscriber identity module (eUICC) having a profile or a plurality of profiles according to claim 1.

8. The server (SM-DP+) having a profile or a plurality of profiles according to claim 1.

9. The method for changing the state of a profile which is implemented in a subscriber identity module (eUICC) according to claim 7, comprising the following steps, which are carried out in the subscriber identity module (eUICC):

receiving, from a server (eIM), a profile-state operation which aims to change a profile state of the profile from a first profile state to a second profile state;

ascertaining the flag state of the profile-state-management flag;

depending on the ascertained flag state, changing the profile state in accordance with the state operation, or rejecting the execution of the profile-state operation.

10. The method according to claim 9, wherein the state operation provided is an Enable Profile operation or a Disable Profile operation.

11. The method according to claim 9, wherein the server provided is an eSIM IoT remote manager, eIM, GSMA remote management server.

12. The method according to claim 9, wherein the subscriber identity module (eUICC) receives the profile-state operation in a Profile-State-Management package, PSMO package, and the subscriber identity module (eUICC) extracts the profile-state operation from the PSMO package.

* * * * *